Patented June 17, 1947

2,422,299

UNITED STATES PATENT OFFICE 2,422,299

MANUFACTURE OF CHROME ALLOY STEEL FROM A CHARGE CONTAINING CHROME SCRAP

Charles R. Funk, Greensburg, Pa.

No Drawing. Application December 14, 1944,
Serial No. 568,196

8 Claims. (Cl. 75—130.5)

This invention relates to the manufacture of chrome alloy steel from a charge containing chrome scrap, and more particularly to such manufacture in a basic open hearth furnace of the regenerative type.

The principal object of the invention is the recovery of more metallic chrome for the steel from the chrome scrap charged than has heretofore been attainable in such a type of furnace.

A further object is devising a practice for attaining the foregoing result without extending the time period involved in former practice in making chrome steel from chrome scrap, or even the usual time period involved in the manufacture of carbon steel in such a type of furnace.

Another object is devising a practice making it possible, while attaining the foregoing high chrome recovery, to use greater quantities of chrome scrap in the charge than have heretofore been used.

Other and further objects of this invention will appear from the following description and the appended claims.

At the present time there are large quantities of both high content chrome and low content chrome alloy scrap (commonly termed chrome scrap) available. Therefore the desirability of using as much of this scrap in the charge as possible in the manufacture of chrome alloy steel becomes at once apparent.

Heretofore little thought has been given to the use of large quantities of chrome scrap in the charge for the purpose of providing a source of large quantities of metallic chrome. Therefore a practice was formerly followed conducive to the use of only relatively small quantities of such scrap in the charge and to the recovery of relatively small percentages of metallic chrome therefrom.

Usually in such former practices an average of about 18% to 28% of the metallic chrome in the scrap is recovered for the steel whereas in the present method a recovery of 70% and over of the metallic chrome in the scrap has been attained for the steel.

In using very large quantities of chrome scrap, particularly high chrome content scrap, and in recovering a large percentage of the chrome present, three problems are presented, namely (1) melting the scrap, (2) obtaining a workable slag so that the metal can be properly refined, and (3) recovering the maximum amount of metallic chrome from the charge.

The first problem involves melting the chrome scrap so that furnace time of the melt is no longer than that of a carbon scrap charge and conventional open hearth practice. This can be accomplished by proper charge of the chrome scrap, paying particular attention to size of scrap and the time interval between finish of chrome scrap charge and the later charging of pig iron where pig iron is used. The pig iron charge should not be made until the chrome scrap is more completely melted than the carbon scrap would be by conventional practice, which is possible since the presence of chrome oxide (which is formed when the chrome scrap is melted) prevents high foaming of the slag. In the case of an all-chrome-scrap charge, replacing the pig iron by graphite or some such carbon source, a time interval should be allowed between the first scrap charge and the last scrap charge, the exact time being determined by the furnace operator. Very great care should be exercised in selecting the scrap, paying particular attention to the content of light to heavy melt scrap present.

The second problem, that of obtaining a workable slag, can be solved by properly charging so that the silicon in the charge is lower than usual, or by providing the correct quantity of lime so that melt-in slag will be low in iron oxide and have a lime-silica ratio of not less than 1 with only very small quantities of undissolved lime present, and thereafter making additions to the slag as will later appear.

The third problem, that of recovering a high percentage of metallic chrome from the scrap, involves a very rigid slag control. It is essential that the slag be held at 1.2 to 1.9 lime-silica ratio during the working period and then by proper additions of lime (burnt lime), silicon, coke (or coal) and fluorspar, the ratio be rapidly increased and the iron oxide kept low or even reduced. The additions must be properly made and at the correct time or the proper reactions will not occur.

In solving the three problems much will depend upon attaining the most efficient temperatures of the metal and slag. High temperatures are inducive to high chromium recovery.

At the outset it may be stated that the quantity of chrome in the steel is a function of the chrome content of the charge, the lime and silica contents of the slag, the iron oxide content of the slag, the temperature of the metal and slag, and the quantity of the slag involved. This involves a controlled charge so as to obtain the desired lime, silica, and iron oxide in the slag as well as the correct slag volume at melt-in, and particularly a method of slag development by additions of lime, silicon, coke (or coal) and fluorspar singly or in mixtures so as to obtain certain and definite reactions which will result in the reduction of the chrome oxide from the slag to metallic chrome which goes over to the metal bath. It is advisable to use a burnt lime charge (at least 60% burnt lime) in place of raw limestone since it is essential that the proper basicity at melt-down be obtained, and secondly, that the melt be worked under an extremely low slag volume. The amount of lime charged will also be governed to some extent by the amount of phosphorus in the charge and the maximum limits of phosphorus allowed for the particular metal specification being produced.

The relative percentages of the lime and silica, that is to say the value of the ratio CaO/SiO$_2$ symbolized by "V", is very important, as will later more fully appear. The working of the slag, according to the present invention, is also very important and should be carried out by efficient operators who must not only be efficient generally speaking but also efficient as to the practice to be followed in working the slag according to the present invention if the desired results are to be obtained.

Of course highly refined steel is of first importance, and the charging, working and refining periods are directed toward this end. But furthermore the working period of the present invention involves a practice directed toward obtaining the high percentage of chromium from the scrap which requires close adherence to the proper temperatures and the proper proportions of the materials regarding which the percentage of chrome recovery is a factor, as previously mentioned.

The slag must be carefully watched (1) to obtain the proper volume of slag; (2) to limit the quantity of iron oxide; (3) to obtain the proper "V" values; and (4) the slag and metal must be carefully watched to obtain the proper temperatures. It is important that the slag volume does not become excessive, also that the quantity of iron oxide does not become excessive, and that the proper "V" values be obtained as conditions require.

The control of the factors will be largely dependent upon the materials used in making up the charge as the quantities of the materials and the factors will vary according to the nature of the charge and are due largely to the chrome scrap, pig-iron if used, and burnt lime and/or limestone.

The chromium recovery is carried out largely toward the end of the heat when an increase in basicity and a decrease in ferrous oxide has been obtained by means of a slag deoxidizer. The slag in its early stages is more or less acid. Some of the melted iron is oxidized, appearing at least in one form as FeO, and the melted chrome reacts with the iron oxide to form chrome oxide, appearing at least in one form as Cr$_2$O$_3$, the reaction being indicated by the equation.

$$2Cr + 3FeO = Cr_2O_3 + 3Fe$$

This chrome oxide, where the slag is acid, has a strong affinity for the iron oxide present and reacts therewith, appearing in another form, called "spinels," which for the present purpose may be indicated by FeO.Cr$_2$O$_3$, which are known as chromite spinels. These chromite spinels are insoluble in the slag while the chrome oxide is held in solid solution in the oxide phase of the slag.

The chromite spinels present a difficulty in the formation of a workable slag and in the recovery of metallic chrome therefrom as in spinel form the chrome oxide can not be reduced. The presence of spinels decreases the fluidity of the slag making it less workable. Therefore their formation should be prevented and those formed should be dissolved as rapidly as possible. The factor which governs or controls the form of the chrome oxide is the degree of basicity of the slag (with certain basicities the spinels, and with other basicities the chrome oxide in solid solution in the oxide phase of the slag). While the spinels are most always present in the very early acid stages of the slag it is highly desirable that their formation be prevented in the later stages of the slag. Therefore the slag, as soon as it is practicable, is transformed to an intermediate basic slag, in which slag the spinels do not form if the basicity is sufficient. The transformation from acidity to basicity is performed by the addition of a sufficient amount of lime, burnt lime and/or limestone being used for this purpose, the object being to obtain a proper "V" value, this value being increased with increase of added lime.

Furthermore the addition of the lime results in the dissolution of the spinels, thereby freeing the chrome oxide from the iron oxide. By the employment of this slag control procedure which involves strong deoxidizers the chrome oxide is transformed into metallic chrome which leaves the slag and passes to the metal. It is contemplated to add carbon in some form to serve as a deoxidizer and to prohibit further formation of iron oxide although the addition in some cases may not be necessary. When some of the carbon added unites with some of the lime present to form a calcium carbide, this compound reacts to deoxidize the iron oxide and possibly the chrome oxide, the reactions being indicated by the equations:

(1)  $CaC_2 + 3FeO = CaO + 3Fe + 2CO$
(2)  $CaC_2 + Cr_2O_3 = CaO + 2CO + 2Cr$

When calcium carbide does not form it is presumed that the deoxidizing reaction is according to the following equation:

(1)  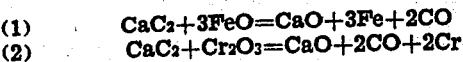

It has been stated that the presence of excessive iron oxide should be prevented. This will be accomplished by the lime and silicon and by the carbon which protects the iron against further oxidation. Furthermore addition of aluminum, silicon and/or calcium carbide to the slag may effect an iron oxide reduction according to the following equations:

(1)  $2Al + 3FeO = Al_2O_3 + 3Fe$
(2)  $Si + 2FeO = SiO_2 + 2Fe$
(3)  $CaC_2 + 3FeO = CaO + 2CO + 3Fe$

The characteristics of the slags are studied by a pancake test which may be of any size, and/or by chemical analysis. The pancake test is probably the safest and surest way of observing for spinel structures as well as estimating the iron oxide and lime-silica ratios. It is desirable to melt-in with a lime-silica ratio or "V" value of 1.0 to 1.4, preferably 1.4 of the ice-fern type slag rather than the furrowed type slag. The icefern slag is lower in iron oxide and is usually more fluid. Additions of coke, coal, silicon, or aluminum to the furrowed slag will help lower the iron oxide and possibly change the slag to the ice-fern type.

As the steel-making operation progresses, lime should be added to increase the "V" value to 2.0 to 2.4, although chrome reduction will occur at lower "V" values. The iron oxide content of the slag should be under 7% at this time (the lower the better), but if above it may be reduced by moving, through the slag, rods to which a few pounds of aluminum have been tied, or by further additions of silicon since aluminum is fairly expensive.

Before the main chrome reduction a reboil is used to assure proper temperatures as well as for other metallurgical reasons. Approximately one hour before the reboil, the first lime-coke, lime-silicon-coke, lime-silicon, or lime additions are made to increase the "V" value and to provide a strong deoxidizer. Further additions of lime-coke and silicon are also made if desired. Short block periods are very desirable also, and the absolute minimum of silicon in the block is advisable.

As has been stated, it is essential in carrying out the invention to provide a slag conducive to large chrome recovery and one that is easily workable. The slag must be kept very fluid at all times during the working period. This will permit satisfactory heat transfer to the metal, will prevent excessive iron oxide formation, and will leave the chrome oxide free for reduction.

The volume of the slag should be kept down within good working limits. If one desires, the pig iron of the charge may be replaced with graphite or some such suitable material. This will allow lower flux charges, thus resulting in lower slag volume. Ordinarily it is not desirable to add silicon or silicon-containing material to such a charge as the charge will generally contain sufficient of this material. To add silicon in the charge would only increase the volume of the slag, lending to its acidity and requiring thereby the addition of more lime or lime-containing material to counteract the acidity, such addition of lime furthermore increasing the volume of the slag. A slag volume of 7% of the scrap charge should be considered maximum.

The invention is adaptable to various charges. The practice of working the slag will vary according to the charge employed and will further vary according to the particular construction of the basic open hearth regenerative furnace employed.

As an instance of a suitable charge may be mentioned one where pig iron, in addition to the chrome scrap, is employed in the charge. Here preferably the pig iron should have a low silicon content, for example not more than 1%. Where pig iron is not easily available or where it is more economical to replace the pig iron or where a larger quantity of metallic chromium is desired for the metal the pig iron may be replaced in whole or in part by a carbon addition such as coal, briquetted charcoal, coke or graphite, preferably graphite. Coal and coke are less desirable than graphite. The coal causes considerable ash which may cause checkers to clog, is bulky and burns or oxidizes very quickly. The coke is bulky, thus choking the furnace during charge, and oxidizes somewhat faster than graphite.

Typical charges for the pig iron practice and for the all scrap practice along with a typical furnace practice are listed below.

Pig Iron Charge—63-ton heat

Charge: Started at 2:38.
Metal charge:

| | Percent |
|---|---|
| Pig iron (1.45% Mn—1.2% Si—.180 P) | 36.0 |
| Scrap: | |
| Light (Cr Mo) | 35.0 |
| Heavy (Cr Mo) | 29.0 |
| | 100.0 |

Flux:

| | |
|---|---|
| Burnt lime | 1.2% of metal charge |
| Limestone | 2.5% of metal charge |

FURNACE PRACTICE

| Time | Additions | Metal | | | Slag | |
|---|---|---|---|---|---|---|
| | | C | Mn | Cr | CaO/SiO$_2$ | FeO |
| 7:13 | 2000# Ore | 1.30 | .22 | .12 | 1.2 | 11.5 |
| 8:15 | 700# Ore | .95 | .22 | .14 | 1.4 | 9.0 |
| 8:48 | 600# Burnt Lime | .76 | | | | |
| 9:00 | 200# Burnt Lime—100# Coke | | | | | |
| 9:30 | | .73 | .24 | .18 | 1.65 | 7.19 |
| 9:48 | 400# Burnt Lime—200# Coke—40# Spar | .55 | .24 | .23 | 1.74 | 6.77 |
| 10:25 | 100# Coke | | | | | |
| 10:30 | 1000# Spiegel (Reboil) | | | | | |
| 11:05 | 200# Burnt Lime | .42 | .45 | .41 | 2.02 | 5.92 |
| 11:25 | 200# Burnt Lime—100# Coke | | | | 2.06 | 5.78 |
| 11:28 | Sil Mn Block | .39 | .52 | .38 | 2.19 | 6.20 |
| 11:48 | Tap | .35 | .88 | .41 | 2.20 | 4.94 |
| | | | | | 2.14 | 4.23 |

Charge to tap—9 hours ten minutes.
Chrome in charge—634#—.50 points.
Chrome recovered—516#—.41 points.
Per cent chrome recovered—81.5.

Graphite charge—64-ton heat

Charge: Started at 4:30.
Metal charge:

| | Percent |
|---|---|
| Light scrap (Cr Mo) | 21.0 |
| Heavy scrap (Cr Mo) | 79.0 |
| | 100.0 |

Flux:

| | |
|---|---|
| Burnt lime | 1.25% of metal charge |
| Graphite | 2.50% of metal charge |
| Spiegel | 1.50% of metal charge |

FURNACE PRACTICE

| Time | Additions | Metal | | | Slag | |
|---|---|---|---|---|---|---|
| | | C | Mn | Cr | CaO/SiO$_2$ | FeO |
| 11:16 | 1200# Ore | 1.24 | .29 | .11 | 1.37 | 7.33 |
| 11:55 | 1000# Ore—300# Burnt Lime | | | | 1.26 | 10.43 |
| 12:30 | 400# Burnt Lime—200# Coke (12-45) | | | | | |
| 1:05 | 400# Burnt Lime—100# Coke | .53 | .29 | .24 | 1.34 | 7.61 |
| 1:17 | 200# Burnt Lime—50# Coke | | | | | |
| 1:24 | 1000# Spiegel (Reboil) | | | | 1.85 | 5.36 |
| 1:30 | 1000# Burnt Lime—100# Coke | .36 | .39 | .41 | | |
| 1:44 | Sil Mn Block | .34 | .51 | .46 | 2.69 | 4.51 |
| 2:04 | Tap | .37 | .92 | .51 | 2.60 | 4.2 |

Charge to tap—9 hours 34 minutes.
Chrome in charge—934#—.73 points.
Chrome recovered—653#—.51 points.
Per cent chrome recovered—70.

While there have been hereinbefore described approved embodiments of this invention it will be understood that many and various changes and modifications thereof may be made without departing from the spirit of the invention and that all such changes and modifications as fall within the scope of the appended claims are contemplated as a part of this invention.

The invention claimed and desired to be secured by Letters Patent is:

1. The method of making chrome steel in a basic open hearth furnace of the regenerative type which consists in charging the furnace with lime-containing material and light chrome steel scrap, partially melting said material and scrap, continuing charging heavy chrome steel scrap, said melting partially melting said heavy scrap, said molten material and scrap forming a slag containing chrome oxide restricting foaming of said slag, charging pig iron low in silicon adding to said slag, said lime-containing material charge being proportioned relative to said other charges so that substantially all of the lime therein is dissolved, said slag being low in volume, low in iron oxide, having a lime to silica ratio at melt-in in said furnace of not less than 1 and having chrome oxide in a reducible form, thereafter working said slag and adding lime-containing material to said slag, said added lime increasing said ratio and thereby the basicity of said slag and the quantity of chrome oxide in a reducible form, said increased ratio being from 1.2–1.9, thereafter adding more lime-containing material to further increase said ratio and adding carbon-containing material, the added carbon and lime effecting deoxidation of said chrome oxide whereby said chrome oxide is reduced to metallic chrome and forced back into the molten metal, and finally tapping said molten metal, at least 70% of the chrome content of said scrap being present in said tapped molten metal.

2. The method of making chrome steel in a basic open hearth furnace which consists in forming a mass of molten metal and slag from materials containing iron, chrome, carbon, lime and silicon in proportions such that said slag is low in volume, low in iron oxide, has a lime to silica ratio at melt-in of said materials in said furnace of from 1.0–1.4 and has chrome oxide in a reducible form, said slag being of the ice-fern type, the material containing said chrome being chrome steel scrap, thereafter working said slag and adding lime-containing material and carbon-containing material to said slag, said added lime increasing said ratio and thereby the basicity of said slag and the quantity of chrome oxide in a reducible form, deoxidizing some of the iron oxide by an addition of one or more of the materials of the group containing aluminum, silcon and calcium carbide, the materials of the group deoxidizing according to the following equations

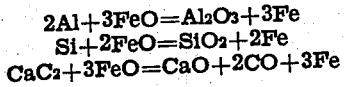

to reduce said iron oxide to not more than 7% of said slag, adding more carbon-containing material and lime-containing material further increasing said ratio, said further increased ratio being from 2.0–2.4, thereby effecting further deoxidation of iron oxide and deoxidation of said chrome oxide whereby said chrome oxide is reduced to metallic chrome and forced back into the molten metal, and finally tapping said molten metal.

3. The method of making chrome steel in a basic open hearth furnace which consists in boiling a mass of molten metal and acid slag formed from materials containing iron, chrome, carbon, lime and silcon in proportions such that said slag has a volume not greater than 5% of the charge, is low in iron oxide, has a lime to silica ratio at melt-in of said materials in said furnace of not less than 1 and has chrome oxide in a reducible form, the material containing said chrome being chrome steel scrap, thereafter adding material to said slag of a character to make said slag more fluid and working said slag and adding lime-containing material and carbon-containing material to said slag and stirring said slag to increase its contact with said molten metal, said added lime increasing said ratio and making said slag basic, reboiling said molten metal and slag to obtain a good chrome reduction temperature, adding further lime-containing material and carbon-containing material, further increasing said ratio and slag basicity and the quantity of chrome oxide in a reducible form, the added carbon and lime effecting the deoxidation of said chrome oxide whereby said chrome oxide is reduced to metallic chrome and forced back into the molten metal, and finally tapping said molten metal.

4. The method of making chrome steel in a basic open hearth furnace which consists in charging the furnace with lime-containing material, carbon-containing material and light chrome steel scrap, partially melting said materials and scrap, charging heavy chrome steel scrap, continuing said melting partially melting said heavy scrap, said materials and scrap being low in silicon, said scrap providing substantially all the iron for said steel, said melting of said scrap forming iron oxide and silica, some of said iron oxide reacting with the chrome in said molten scrap and forming chrome oxide and iron, thereby reducing the quantity of said iron oxide, said carbon, silicon and lime limiting the iron oxidation, said oxides and silica forming a slag, said materials and scrap being proportioned so that substantially all of the lime is dissolved, and so that said slag is low in volume, low in iron oxide, has a lime to silica ratio at melt-in of said materials in said furnace of not less than 1 and and scrap in said furnace of not less than 1 and has chrome oxide in a reducible form and spinels, thereafter working said slag and adding lime-containing material to said slag, said added lime increasing said ratio and thereby the basicity of said slag and the quantity of chrome oxide in a reducible form by decreasing the quantity of spinels, said increased ratio being from 1.2–1.9, thereafter adding more lime-containing material to increase said ratio and adding carbon-containing material, the added carbon and lime effecting the deoxidation of said chrome oxide whereby said chrome oxide is reduced to metallic chrome and forced back into the molten metal, and finally tapping said molten metal, at least 70% of the chrome content of said scrap being present in said tapped molten metal.

5. The method of making chrome steel in a basic open hearth furnace which consists in charging the furnace with lime-containing material and light chrome steel scrap, partially melting said material and scrap, charging heavy chrome steel scrap, continuing said melting partially melting said heavy scrap, charging pig iron low in silicon and containing carbon, said pig iron and scrap forming iron oxide and silica, some of said iron oxide reacting with the chrome in said molten scrap and forming chrome oxide and iron, thereby reducing the quantity of said iron oxide, said carbon, silicon and lime limiting the iron oxidation, said oxides and silica forming a slag, said material, scrap and pig iron being proportioned so that substantially all of the lime is dissolved and so that said slag is low in volume, low in iron oxide, has a lime to silica ratio at melt-in in said furnace of not less than 1 and has chrome oxide in a reducible form and spinels, thereafter working said slag and adding lime-containing material to said slag, said added lime increasing said ratio and thereby the basicity of said slag and the quantity of chrome oxide in a reducible form by decreasing the quantity of spinels, said increased ratio being from 1.2-1.9, thereafter adding more lime-containing material to increase said ratio and adding carbon-containing material, the added carbon and lime effecting the deoxidation of said chrome oxide whereby said chrome oxide is reduced to metallic chrome and forced back into the molten metal, and finally tapping said molten metal, at least 70% of the chrome content of said scrap being present in said tapped molten metal.

6. The method of making chrome steel in a basic open hearth furnace which consists in charging the furnace with burnt lime, limestone, and light chrome steel scrap, partially melting said charge, charging heavy chrome steel scrap, continuing said melting partially melting said heavy scrap, charging low silicon and phosphorus pig iron, said scrap and pig iron being the metal source for said steel, substantially 35% by weight of said source being light scrap, 29% being heavy scrap and 36% being pig iron, said burnt lime being substantially 1.2% of said source and said limestone being substantially 2.5% of said source, said molten charge forming a slag containing chrome oxide, iron oxide and silica, being low in undissolved lime, low in volume, and low in iron oxide, having a lime to silica ratio at melt-in in said furnace of not less than 1 and having, due to chrome oxidation by reaction with said iron oxide, chrome oxide in a reducible form, thereafter boiling, working and reboiling said slag, and adding thereto from the beginning of working to reboil in successive steps, additions of ore, burnt lime, burnt lime-coke, burnt lime-coke-spar, coke and spiegel, said added lime increasing said ratio and thereby the basicity of said slag and the quantity of chrome oxide in a reducible form, said increased ratio being from 1.2-1.9, after said reboil adding more burnt lime and burnt lime-coke to increase said ratio and to effect the deoxidation of said chrome oxide whereby said chrome oxide is reduced to metallic chrome and forced back into the molten metal, then blocking with a silicon manganese block, and finally tapping said molten metal, at least 70% of the chrome content of said scrap being present in said tapped molten metal.

7. The method of making chrome steel in a basic open hearth furnace which consists in charging the furnace with burnt lime, carbon-containing material, spiegel and light chrome steel scrap, partially melting said charge, charging with heavy chrome steel scrap, continuing said melting partially melting said heavy scrap, substantially one-fifth by weight of said scrap being light and the remainder being heavy, said burnt lime being substantially 1.25% of said scrap and said spiegel being substantially 1.5% of said scrap, said scrap and spiegel providing substantially all the iron for said steel, said molten charge forming a slag containing chrome oxide, iron oxide and silica and being low in undissolved lime, low in volume, low in iron oxide, having a lime to silica ratio at melt-in in said furnace of not less than 1 and having, due to chrome oxidation by reaction with said iron oxide, chrome oxide in a reducible form, thereafter boiling, working and reboiling said slag, and adding thereto from the beginning of working to reboil in successive steps, ore, ore-burnt lime, additions of burnt lime-coke, and spiegel, said added lime increasing said ratio and thereby the basicity of said slag and the quantity of chrome oxide in a reducible form, said increased ratio being from 1.2-1.9, after said reboil adding more burnt lime and coke to further increase said ratio and to effect the deoxidation of said chrome oxide whereby said chrome oxide is reduced to metallic chrome and forced back into the molten metal, then blocking with a silicon manganese block, and finally tapping said molten metal, at least 70% of the chrome content of said scrap being present in said tapped molten metal.

8. A method of making chrome alloy steel in a basic open hearth furnace of the regenerative type which consists in charging the furnace with materials containing silicon, chrome, iron, lime and carbon, one of said materials being chrome steel scrap; heating the charge providing thereby molten metal and a slag thereon containing chrome oxide, iron oxide, silica and substantially all of said lime with a lime-silica ratio of not less than 1, rendering said slag suitable for working; working said slag, during the refining of said molten metal, including adding lime thereto, thereby increasing the lime-silica ratio to from 1.2 to 1.9 for increasing the basicity of said slag to increase the reducible chrome oxide in said slag and for stabilizing said silica and lime, thereby providing a slag from which metal oxides can be reduced, and adding carbon to said slag to reduce iron oxide and to prevent further iron oxidation; thereafter further adding to said slag at a chrome oxide reducing temperature, lime and carbon, said further lime addition being sufficient to increase said lime-silica ratio to from 2.0 to 2.4 for further increasing the basicity of said slag, said further carbon addition being in sufficient quantity to effect reduction of said chrome oxide in said slag, the chrome of said chrome oxide returning to said molten metal; and tapping said molten metal.

CHARLES R. FUNK.

REFERENCES CITED

The following references are of record in the file of this patent:

UNITED STATES PATENTS

| Number | Name | Date |
| --- | --- | --- |
| 1,449,319 | Greene | Mar. 20, 1923 |
| 1,410,749 | Hadfield | Mar. 28, 1922 |
| 2,218,391 | Bradford et al. | Oct. 15, 1940 |

OTHER REFERENCES

Metal Progress, April 1942, pages 506 to 509, inclusive, and 582.